(12) United States Patent
Seo

(10) Patent No.: US 8,925,318 B2
(45) Date of Patent: Jan. 6, 2015

(54) WASTE HEAT RETRIEVAL SYSTEM OF VEHICLE

(71) Applicant: Hyundai Motor Company, Seoul (KR)

(72) Inventor: Jungmin Seo, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 127 days.

(21) Appl. No.: 13/713,712

(22) Filed: Dec. 13, 2012

(65) Prior Publication Data

US 2014/0116050 A1    May 1, 2014

(30) Foreign Application Priority Data

Oct. 30, 2012 (KR) .......................... 10-2012-0121389

(51) Int. Cl.
*F01K 23/10* (2006.01)
*F01K 3/00* (2006.01)

(52) U.S. Cl.
CPC .. *F01K 3/00* (2013.01); *Y02T 10/16* (2013.01); *Y02T 10/166* (2013.01)
USPC .............................................. 60/618; 60/320

(58) Field of Classification Search
USPC ................... 60/320, 614–618, 623, 640
See application file for complete search history.

(56) References Cited

U.S. PATENT DOCUMENTS

| 4,300,353 | A | * | 11/1981 | Ridgway | 60/618 |
| 4,406,127 | A | * | 9/1983 | Dunn | 60/618 |
| 8,528,333 | B2 | * | 9/2013 | Juchymenko | 60/618 |
| 8,534,065 | B2 | * | 9/2013 | Pursifull et al. | 60/611 |
| 8,561,392 | B2 | * | 10/2013 | Ogunleye et al. | 60/286 |
| 2001/0005213 | A1 | * | 6/2001 | Ikeda et al. | 347/70 |
| 2010/0132338 | A1 | * | 6/2010 | Schmale et al. | 60/287 |
| 2013/0219872 | A1 | * | 8/2013 | Gibble et al. | 60/320 |
| 2013/0327041 | A1 | * | 12/2013 | Gaertner et al. | 60/615 |

FOREIGN PATENT DOCUMENTS

WO    WO 2012/079709 A1 *  6/2012  ............... F02G 5/02

* cited by examiner

*Primary Examiner* — Thomas Denion
*Assistant Examiner* — Steven D Shipe
(74) *Attorney, Agent, or Firm* — Morgan, Lewis & Bockius LLP

(57) ABSTRACT

A waste heat retrieval system of a vehicle may include a reservoir disposed in a lower side of a exhaust gas boiler and in which a predetermined space is formed, a retrieval line that connects the exhaust gas boiler with the reservoir, a retrieval supply control valve disposed to open or close the retrieval line, and a control portion that controls the retrieval supply control valve to open the retrieval line such that working fluid of the exhaust gas boiler is returned to the reservoir if a retrieval condition is satisfied. Accordingly, the working fluid of the exhaust gas boiler in a waste heat retrieval system may be retrieved to the reservoir and therefore the freezing problem of the working fluid can be substantially resolved.

9 Claims, 3 Drawing Sheets

WASTE HEAT RETRIEVAL SYSTEM OF VEHICLE

CROSS-REFERENCE TO RELATED APPLICATION

The present application claims priority of Korean Patent Application Number 10-2012-0121389 filed Oct. 30, 2012, the entire contents of which application is incorporated herein for all purposes by this reference.

BACKGROUND OF INVENTION

1. Field of Invention

The present invention relates to a waste heat retrieval system of a vehicle that retrieves waste heat that is exhausted from a vehicle through working fluid and transforms the retrieved heat energy to kinetic energy to improve overall energy efficiency.

2. Description of Related Art

Generally, arts for retrieving energy from gas exhausted from an engine have been developed.

One type of the arts uses a turbo generator that transforms energy of exhaust gas directly to rotation energy to generate electricity, and another type thereof uses a Rankin cycle that generates steam by using heat of exhaust gas and rotates a turbine through the steam. Also, there is an art that uses a thermo element to generate electrical energy.

A separate working fluid is used in the Rankin cycle to retrieve the heat energy from the exhaust gas that is wasted, and one such fluid can be water.

However, the freezing point of water is 0 degrees Celsius, so it is hard to apply the water to the Rankin cycle as a working fluid in various driving conditions of a vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a waste heat retrieval system of a vehicle having advantages of preventing the freezing of water that is used as a working fluid that is used in a Rankin cycle to retrieve energy of exhaust gas that is wasted.

A waste heat retrieval system of a vehicle includes an exhaust gas boiler that uses exhaust gas of an engine to vaporize a working fluid, including a superheater that heats the vaporized working fluid that is generated from the exhaust gas boiler, and a turbine that uses the vaporized working fluid that is generated from the superheater to generate torque. Various aspects of the present invention provide for a system that may include: a reservoir that is disposed in a lower side of the exhaust gas boiler and in which a predetermined space is formed; a retrieval line that connects the exhaust gas boiler with the reservoir; a retrieval supply control valve that is disposed to open or close the retrieval line; and a control portion that controls the retrieval supply control valve to open the retrieval line such that the working fluid of the exhaust gas boiler is returned to the reservoir if a retrieval condition is satisfied.

The waste heat retrieval system may further include a supply line that is formed from the reservoir to the retrieval control valve, and a working fluid supply pump that is mounted on the supply line to supply the working fluid of the reservoir to the exhaust gas boiler, wherein the control portion controls the retrieval supply control valve and the working fluid supply pump to supply the working fluid of the reservoir to the exhaust gas boiler if the supply condition is satisfied.

The waste heat retrieval system may further include a heating line through which coolant of the engine circulates through the reservoir so as to heat the working fluid of the reservoir, and a heating control valve that is disposed to open or close the heating line.

The control portion may detect the temperature of the working fluid in the reservoir, and if the temperature is less than a predetermined temperature, opens the heating control valve such that the working fluid of the reservoir is heated to a predetermined temperature, before the working fluid supply pump is operated to supply the working fluid of the reservoir to the exhaust gas boiler.

The waste heat retrieval system may further include an outside air control valve that selectively connects an interior room of the reservoir and an interior room of the superheater with outside air.

The control portion may open the outside air control valve when the working fluid is retrieved from the exhaust gas boiler to the reservoir or the working fluid is supplied from the reservoir to the exhaust gas boiler.

The waste heat retrieval system may further include a condenser that condenses working fluid gas that is exhausted from the turbine, a refrigerant circulation pump that circulates refrigerant from the condenser to a refrigerant cooler, a cooling fan that cools the refrigerant cooler, and a working fluid circulation pump that supplies condensed working fluid of the condenser to the exhaust gas boiler, wherein the control portion retrieves the condensed working fluid to the exhaust gas boiler by operating the working fluid pump and the cooling fan if the retrieval condition is satisfied.

The control portion may control the retrieval supply control valve to close the retrieval line and the outside air control valve if it is determined that the level of the reservoir is higher than a predetermined value.

The control portion may open the heating control valve such that the working fluid in the reservoir is heated to higher than a predetermined temperature, close the heating control valve, operate the working fluid supply pump to supply the operating fluid of the reservoir to the exhaust gas boiler, and if it is determined that the level of the working fluid of the reservoir is less than a predetermined value, stop supplying of the operating fluid by stopping the working fluid supply pump and close the outside air control valve.

The working fluid may include water.

The retrieval condition may include a case that outside temperature is lower than a predetermined value while the engine is in a turned-off condition.

The supply condition may include a case that the temperature of the working fluid is higher than a predetermined value when the engine is turned on.

As described above, in a waste heat retrieval system of a vehicle according to various aspects of the present invention, the working fluid of the exhaust gas boiler in a waste heat retrieval system may be retrieved to the reservoir and therefore the freezing problem of the working fluid can be substantially resolved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
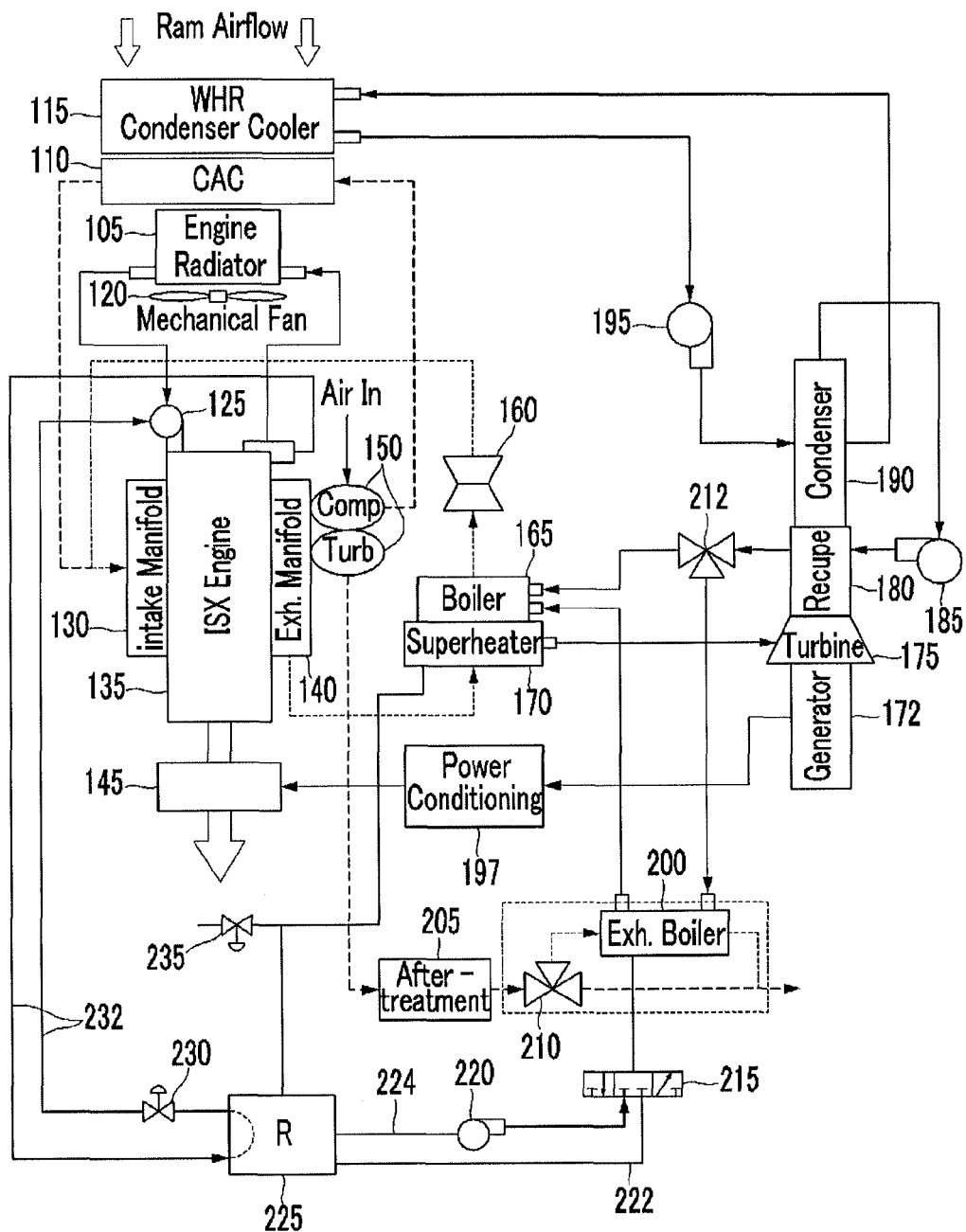
FIG. 1 is a schematic diagram of an exemplary waste heat retrieval system of a vehicle according to the present invention.

FIG. 1 is a schematic diagram of a waste heat retrieval system of a vehicle according to various embodiments of the present invention.

Referring to FIG. 1, a waste heat retrieval system of a vehicle includes a refrigerant cooler 115, an intercooler 110, an engine radiator 105, a cooling fan 120, a coolant pump 125, an intake manifold 130, an engine 135, an exhaust manifold 140, a turbocharger 150, a motor-generator 145, a superheater 170, a boiler 165, an EGR valve 160, a refrigerant circulation pump 195, a condenser 190, a recuperator 180, a working fluid circulation pump 185, a turbine 175, a generator 172, a power controller 197, an exhaust gas boiler 200, a post-treatment device 205, a passage change valve 210, a retrieval supply control valve 215, a supply line 224, a retrieval line 222, a working fluid supply pump 220, a reservoir 225, a heating control valve 230, and a heating line 232.

Further, various embodiments of the present invention includes a control portion, and the control portion controls all constituent elements that can be controlled.

Firstly, the intake air that is compressed by the turbocharger 150 is cooled by the intercooler 110 to be supplied to the intake manifold 130, and the mixture of the intake air and the fuel is combusted in a combustion chamber of the engine 135 to be exhausted through the exhaust manifold 140.

The exhaust gas that is exhausted through the exhaust manifold 140 rotates the turbine of the turbocharger 150 and then passes the post-treatment device 205 and the exhaust gas boiler 200 to be exhausted. Here, the passage change valve 210 selectively supplies the exhaust gas to the exhaust gas boiler 200.

The exhaust gas passing the exhaust manifold 140 is recirculated to the intake manifold 130 through the superheater 170, the boiler 165, and the EGR valve 160.

The working fluid (or water) that is charged in the exhaust gas boiler 200 is heated at a first round, is heated by the boiler 165 at a second round, and is vaporized by the superheater 170 at a third round.

The working fluid that is vaporized in the superheater 170 is transferred to the turbine and the turbine generates electricity through the generator 172. The generated electricity operates the motor-generator 145 or is charged in a rechargeable battery through the power controller 197.

After the vaporized working fluid rotates the turbine and passes the recuperator 180 and the condenser 190, the working fluid (steam) is condensed by the coolant that is circulated by the refrigerant circulation pump 195. Also, the condensed working fluid is distributed to the boiler 165 or the exhaust gas boiler 200 through the working fluid circulation pump 185 and the passage change valve 210.

The reservoir 225 is prepared to retrieve the working fluid that remains in the boiler 165, the superheater 170, the turbine 175, the recuperator 180, the condenser 190, or the working fluid circulation pump 185.

The working fluid that remains in the boiler 165, the superheater 170, the turbine 175, the recuperator 180, the condenser 190, or the working fluid circulation pump 185 is retrieved in the exhaust gas boiler 200 due to gravity, and the working fluid of the exhaust gas boiler 200 are retrieved to the reservoir 225 in a predetermined retrieval (recovery) condition.

More particularly, a lower side of the exhaust gas boiler 200 is connected to the reservoir 225 through a retrieval line 222, and the retrieval supply control valve 215 is disposed on the line 222. Further, a supply line 224 is formed between the reservoir 225 and the retrieval supply control valve 215, and the working fluid supply pump 220 is disposed in the supply line 224.

The control portion controls the retrieval supply control valve 215 and the working fluid supply pump 220 to retrieve the working fluid of the exhaust gas boiler 200 to the reservoir 225 or to supply the working fluid of the reservoir 225 to the exhaust gas boiler 200.

The reservoir 225 and the superheater 170 are connected to the outside air control valve 235. Here, the supply and retrieval of the working fluid are effectively performed by connecting the inside of the reservoir 225 and the superheater 170 with outside air.

When the operating fluid of the reservoir 225 is frozen or the temperature thereof is lower than a predetermined value, the heating line is formed to heat the working fluid.

The heating line 232 uses hot coolant that circulates at a coolant outlet of the engine 135→ the reservoir→ a coolant inlet of the engine 135 to thaw or to heat the working fluid of the reservoir 225.

Here, the control portion detects the temperature of the reservoir 225 and opens or closes the heating control valve 230 that is disposed on the heating line 232.

The control portion operates the refrigerant circulation pump 195, the cooling fan 120, and the working fluid circulation pump 185 to condense the working fluid of the system when the retrieval condition is satisfied. Also, the condensed working fluid is retrieved in the exhaust gas boiler 200 due to gravity.

Next, the control portion opens the outside air control valve 235, and controls the retrieval supply control valve 215 to retrieve the working fluid of the exhaust gas boiler 200 to the reservoir 225. If it is determined that the level of the reservoir 225 is higher than a predetermined value, the control portion closes the retrieval line 222 through the retrieval supply control valve 215 and closes the outside air control valve 235.

The retrieval condition includes a first case that the outside air temperature is lower than a predetermined value or a second case that a retrieval button is turned on in a condition that the engine 135 is turned off.

Also, the control portion opens the outside air control valve 235, controls the retrieval supply control valve 215, and operates the working fluid supply pump 220 to supply the working fluid of the reservoir 225 to the exhaust gas boiler 200, when the supply condition is satisfied.

If it is determined that the level of the reservoir 225 is lower than a predetermined level, the operation of the working fluid supply pump 220 is stopped, the retrieval line 222 is closed through the retrieval supply control valve 215, and the outside air control valve 235 is closed.

The supply condition includes a case that the temperature of the working fluid of the reservoir 225 is higher than a predetermined value in a condition that the engine 135 is being operated.

Here, when the temperature of the working fluid that is charged in the reservoir 225 is lower than a predetermined value, the control portion opens the heating control valve 230 to heat the working fluid of the reservoir 225 through the hot coolant of the engine 135.

In various embodiments of the present invention, the condition that the heating control valve 230 is opened can include a condition that the working fluid inside the working fluid is frozen.

Figure 2:
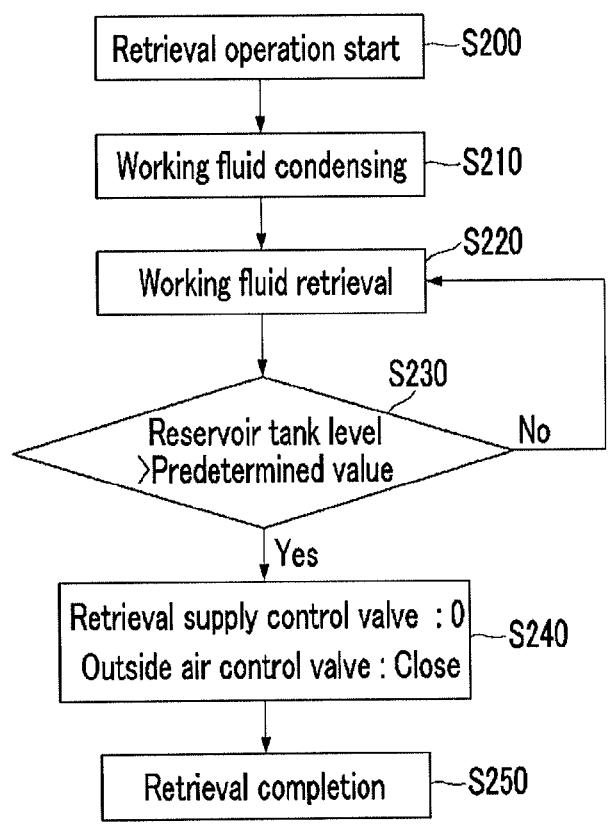
FIG. 2 is a flowchart showing an exemplary method for retrieving working fluid in a waste heat retrieval system of a vehicle according to the present invention.

FIG. 2 is a flowchart showing a method for retrieving working fluid in a waste heat retrieval system of a vehicle according to various embodiments of the present invention.

Referring to FIG. 2, if the retrieval condition is satisfied or the retrieval button for retrieving the working fluid is turned on, a retrieval mode is started in step S200.

The working fluid is condensed in step S210. In various embodiments of the present invention, the working fluid circulation pump 185, the cooling fan, or the refrigerant circulation pump 195 can be operated at maximum load so as to condense the working fluid.

The working fluid that is congregated in the exhaust gas boiler 200 is returned in step S220. In various embodiments of the present invention, the control portion opens the outside air control valve 235 and opens the retrieval line 222 through the retrieval supply control valve 215 so as to retrieve the working fluid.

If it is determined that the level of the working fluid of the reservoir 225 is higher than a predetermined value in step S230, the retrieval line 222 is closed through the retrieval supply control valve 215 in step S240 (it is denoted as "0" in the drawing), and the outside air control valve 235 is closed. Finally, the retrieval mode is completed in step S250 and a completion bulb is lit.

Figure 3:
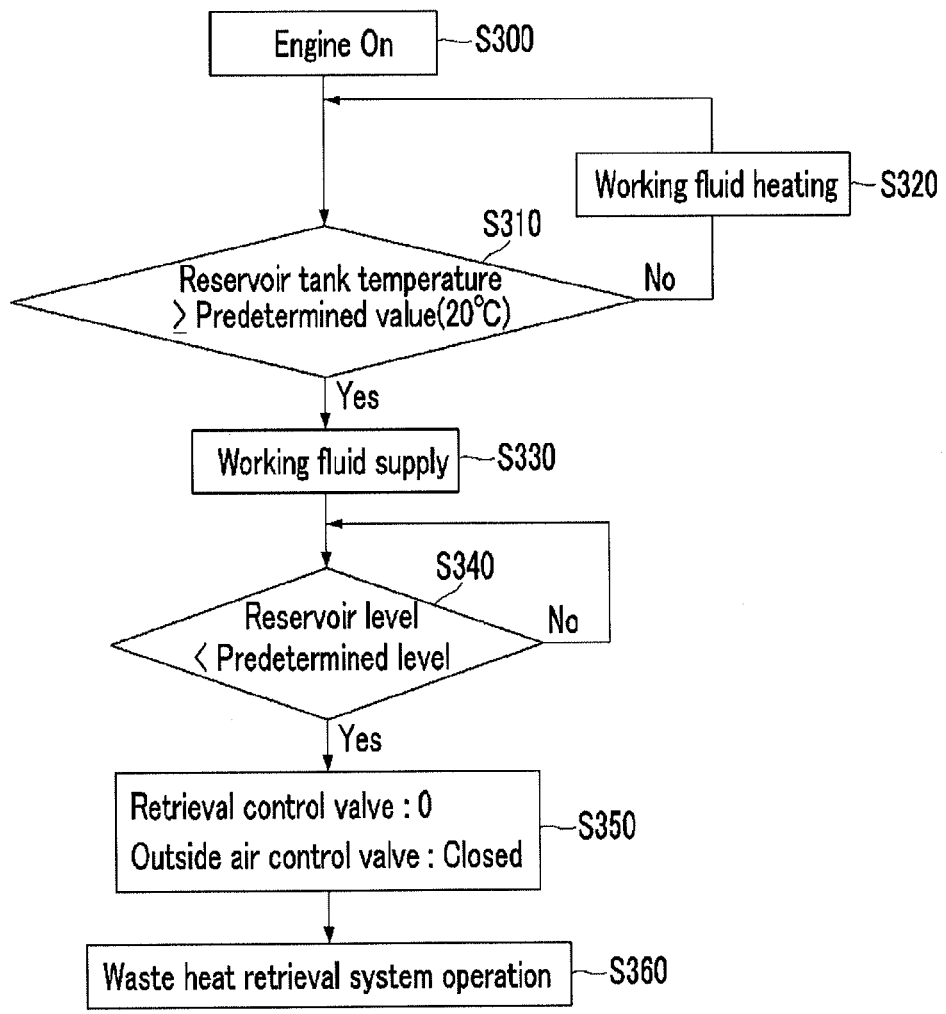
FIG. 3 is a flowchart showing an exemplary method for supplying a working fluid in a waste heat retrieval system of a vehicle according to the present invention.

FIG. 3 is a flowchart showing a method for supplying working fluid in a waste heat retrieval system of a vehicle according to various embodiments of the present invention.

Referring to FIG. 3, the engine 135 is started in step S300. It is determined whether the temperature of the working fluid of the reservoir 225 is higher than a predetermined value in step S310. Here, the predetermined value can be 20 degrees Celsius.

If it is determined that the temperature of the working fluid is lower than a predetermined value, the mode for heating the working fluid of the reservoir 225 is performed in step S320. Here, the control portion opens the heating control valve 230 such that the hot or warm coolant heats the working fluid.

If it is determined that the temperature of the working fluid is higher than a predetermined value, the working fluid is supplied in step S330. Here, the control portion closes the heating control valve 230, opens the outside air control valve 235, controls the retrieval supply control valve 215, and operates the working fluid supply pump 220 to supply the working fluid of the reservoir 225 to the exhaust gas boiler.

If it is determined that the level of the reservoir 225 is lower than a predetermined value in step S340, step S350 is executed. In step S350, the retrieval supply control valve 215 is controlled to close the supply line 224 or the retrieval line 222 (in the drawing, it is denoted by "0"), the working fluid supply pump 220 is turned off, and the outside air control valve 235 is closed.

The waste heat retrieval system is normally operated in step S360. In various embodiments of the present invention, the method for operating the waste heat retrieval system has been known to a person skilled in the art, and therefore the detailed description thereof will be omitted.

In various embodiments of the present invention, various kinds of working fluid can be used, and the heat that is wasted to the outside can be effectively recovered by using water as the working fluid.

Also, because the water has high specific heat, the size of the recovery system can be reduced and the material forming the system can be easily selected, and the stability thereof is high.

Further, when water is used as the working fluid, volume expansion of the frozen water is to be considered in the design the reservoir 225, and the volume expansion problem thereof can be resolved by selecting the material and the capacity of the reservoir.

Also, the reservoir 225 is a close and seal type to be disposed at a lowest position of the retrieval system, and therefore the reservoir 225 effectively retrieves the working fluid and minimizes the natural vaporization amount.

For convenience in explanation and accurate definition in the appended claims, the terms lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A waste heat retrieval system of a vehicle, the system comprising:
    an exhaust gas boiler that uses exhaust gas of an engine to heat working fluid;
    a superheater that vaporizes the heated working fluid generated from the exhaust gas boiler, and a turbine that uses the vaporized working fluid generated from the superheater to generate torque;
    a reservoir disposed in a lower side of the exhaust gas boiler and in which a predetermined space is formed;
    a retrieval line that connects the exhaust gas boiler with the reservoir;
    a retrieval supply control valve disposed to open or close the retrieval line;
    a control portion that controls the retrieval supply control valve to open the retrieval line such that the working fluid of the exhaust gas boiler is returned to the reservoir if a retrieval condition is satisfied;
    a supply line extending from the reservoir to the retrieval control valve;

a working fluid supply pump mounted on the supply line to supply the working fluid of the reservoir to the exhaust gas boiler;
  wherein the control portion controls the retrieval supply control valve and the working fluid supply pump to supply the working fluid of the reservoir to the exhaust gas boiler if a supply condition is satisfied,
a heating line through which coolant of the engine circulates through the reservoir so as to heat the working fluid of the reservoir;
a heating control valve disposed to open or close the heating line; and
an outside air control valve that selectively connects an interior room of the reservoir and an interior room of the superheater with outside air.

2. The waste heat retrieval system of a vehicle of claim 1, wherein the control portion detects a temperature of the working fluid in the reservoir, and if the temperature is less than a predetermined temperature, opens the heating control valve such that the working fluid of the reservoir is heated to a predetermined temperature, before the working fluid supply pump is operated to supply the working fluid of the reservoir to the exhaust gas boiler.

3. The waste heat retrieval system of a vehicle of claim 1, wherein the control portion opens the outside air control valve when the working fluid is retrieved from the exhaust gas boiler to the reservoir or the working fluid is supplied from the reservoir to the exhaust gas boiler.

4. The waste heat retrieval system of a vehicle of claim 1, further comprising:
  a condenser that condenses working fluid gas exhausted from the turbine;
  a refrigerant circulation pump that circulates refrigerant from the condenser to a refrigerant cooler;
  a cooling fan that cools the refrigerant cooler; and
  a working fluid circulation pump that supplies condensed working fluid of the condenser to the exhaust gas boiler,
  wherein the control portion retrieves the condensed working fluid to the exhaust gas boiler by operating the working fluid pump and the cooling fan if the retrieval condition is satisfied.

5. The waste heat retrieval system of a vehicle of claim 4, wherein the control portion controls the retrieval supply control valve to close the retrieval line and the outside air control valve if it is determined that the level of the reservoir is higher than a predetermined value.

6. The waste heat retrieval system of a vehicle of claim 1, wherein the control portion opens the heating control valve such that the working fluid in the reservoir is heated to higher than a predetermined temperature, closes the heating control valve, operates the working fluid supply pump to supply the operating fluid of the reservoir to the exhaust gas boiler, and if it is determined that the level of the working fluid of the reservoir is less than a predetermined value, stops supplying of the operating fluid by stopping the working fluid supply pump and closes the outside air control valve.

7. The waste heat retrieval system of a vehicle of claim 1, wherein the working fluid includes water.

8. The waste heat retrieval system of a vehicle of claim 1, wherein the retrieval condition includes a case that outside temperature is lower than a predetermined value while the engine is in a turned-off condition.

9. The waste heat retrieval system of a vehicle of claim 1, wherein the supply condition includes a case that a temperature of the working fluid is higher than a predetermined value when the engine is turned on.

* * * * *